United States Patent [19]

Igarashi

[11] Patent Number: 5,138,703
[45] Date of Patent: Aug. 11, 1992

[54] METHOD OF AND APPARATUS FOR EXPANDING SYSTEM BUS

[75] Inventor: Tetsu Igarashi, Hachioji, Japan

[73] Assignee: Kabushiki Kaisha Toshiba, Kawasaki, Japan

[21] Appl. No.: 790,070

[22] Filed: Nov. 12, 1991

Related U.S. Application Data

[63] Continuation of Ser. No. 328,496, Mar. 24, 1989, abandoned.

[30] Foreign Application Priority Data

Mar. 31, 1988 [JP] Japan .................. 63-78754

[51] Int. Cl.$^5$ .................................. G06F 13/38
[52] U.S. Cl. ..................... 395/325; 364/DIG.1; 364/240; 364/240.2; 364/238.6; 364/239; 364/240.8; 364/240.9
[58] Field of Search ................ 395/325, 425, 200

[56] References Cited

U.S. PATENT DOCUMENTS

| | | | |
|---|---|---|---|
| 4,041,472 | 8/1977 | Shah et al. | 364/900 |
| 4,205,373 | 5/1980 | Shah et al. | 364/200 |
| 4,228,498 | 10/1980 | Moshier | 364/200 |
| 4,263,649 | 4/1981 | Lapp Jr. | 364/200 |
| 4,390,967 | 6/1983 | Eglowstein et al. | 364/200 |
| 4,451,886 | 5/1984 | Guest et al. | 364/200 |
| 4,514,823 | 4/1985 | Mendelson et al. | 364/900 |
| 4,713,793 | 12/1987 | Conforti | 364/900 |

Primary Examiner—Kevin A. Kriess
Attorney, Agent, or Firm—Oblon, Spivak, McClelland, Maier & Neustadt

[57] ABSTRACT

A method and apparatus for bus expansion, which provides a capability of transferring a data word from a first unit connected to a system bus to a second unit connected to an extension bus, with the first unit receiving a first read request input via the system bus, reading out the data word associated with the first read request, generating a first response in response to reading of the data word, and outputting the first response and the data word onto the system bus, and the second unit generating a second read request in response to an output start command supplied from a central processing unit (CPU) via the extension bus and receiving a second response and a data word from the extension bus. Responsive to the output start command supplied from the CPU, the first read request is selectively generated and output onto the system bus prior to generation of the second read request associated with the first read request. The output start command is also transferred from the CPU to the extension bus, and the data word is stored in a buffer memory responsive to a first response input via the first system bus. Responsive to the second read request input via the extension bus, the data word is selectively read out of the buffer memory and the second response is generated and outputted along with the data word onto the extension bus.

18 Claims, 9 Drawing Sheets

| #1000 | 2000 | FROM #2000 |
| 1004 | 100 | 100 BYTES |
| 1008 | 10000 | TO I/O #10000 |
| 1000 | | |
| 1010 | | |

METHOD OF AND APPARATUS FOR EXPANDING SYSTEM BUS

This application is a continuation of application Ser. No. 07/328,496, filed on Mar. 24, 1989, now abandoned.

BACKGROUND OF THE INVENTION

1. Field of the Invention

The present invention relates to a method of and an apparatus for expanding a system bus.

2. Description of the Related Art

A system for expanding a system bus by using a bus expansion adapter is known. In the system a channel unit connected to the system bus and a channel unit connected to a system bus expanded by the bus expansion adapter, i.e., an expansion system bus, are equally treated from the viewpoint of the overall system. That is, a memory request output from the channel unit connected to the expansion system bus is directly transferred onto the system bus through the bus expansion adapter. For this reason, a channel unit connected to the expansion system bus can perform input/output control between a main memory and an input/output unit as if it were connected to the system bus.

If, however, memory requests are frequently generated from a plurality of channel units connected to the expansion system bus, the load of the system bus is increased. As a result, queue signals are generated from these channel units, and the system throughput is decreased.

SUMMARY OF THE INVENTION

It is, therefore, an object of the present invention to provide a method of expanding a bus and an apparatus therefor, in which data is read out from a main memory in advance prior to a memory request from a channel unit connected to an expansion system bus to that input/output control of data can be properly performed without directly transferring the memory request to a system bus, thereby decreasing the load of the system bus.

In order to achieve the above object, according to the present invention there is provided a new and improved method and apparatus for bus expansion, which provides a capability of transferring a data word from a first unit connected to a system bus to a second unit connected to an extension bus, with the first unit receiving a first red request input via the system bus, reading out the data word associated with the first read request, generating a first response in response to reading of the data word, and outputting the first response and the data word onto the system bus, and the second unit generating a second read request in response to an output start command supplied from a central processing unit (CPU) via the extension bus and receiving a second response and a data word from the extension bus. According to the present invention, responsive to the output start command supplied from the CPU, the first read request is selectively generated and output onto the system bus prior to generation of the second read request associated with the first read request. The output start command is also transferred from the CPU to the extension bus, and the data word is stored in a buffer memory responsive to a first response input via the system bus. Responsive to the second read request input via the extension bus, the data word is selectively read out of the buffer memory and the second response is generated and outputted along with the data word onto the extension bus.

As described above in detail, according to the present invention, a bus expansion adapter itself generates a memory read request on a system bus by utilizing a free time of the system bus regardless of generating of a memory read request from a channel unit connected to an expansion system bus. Data which is read out from a main memory in response to the memory read request is stored in a buffer memory through the system bus. The data stored in the buffer memory is read out from the buffer memory in response to a read request from a channel unit, and is transferred onto the channel unit, which generated the request, through the expansion system bus. Therefore, input/output control of a channel unit can be properly performed as in a conventional system without transferring a memory read request from the channel unit connected to the expansion system bus onto the system bus. As a result, the load of the system bus is decreased, and the system throughput is increased.

DETAILED DESCRIPTION OF THE PREFERRED EMBODIMENTS

Preferred embodiments of a bus expansion apparatus of the present invention will be described below in detail with reference to the accompanying drawings.

Arrangements of a data processing system to which the bus expansion apparatus of the present invention is applied and a first embodiment of the bus expansion apparatus will be described first with reference to FIGS. 1 and 2. In the first embodiment, a buffer memory in the bus expansion apparatus has a capacity of one word, and hence one-word data is transferred from main memory 12 to a channel unit connected to an expansion system bus.

Figure 1:
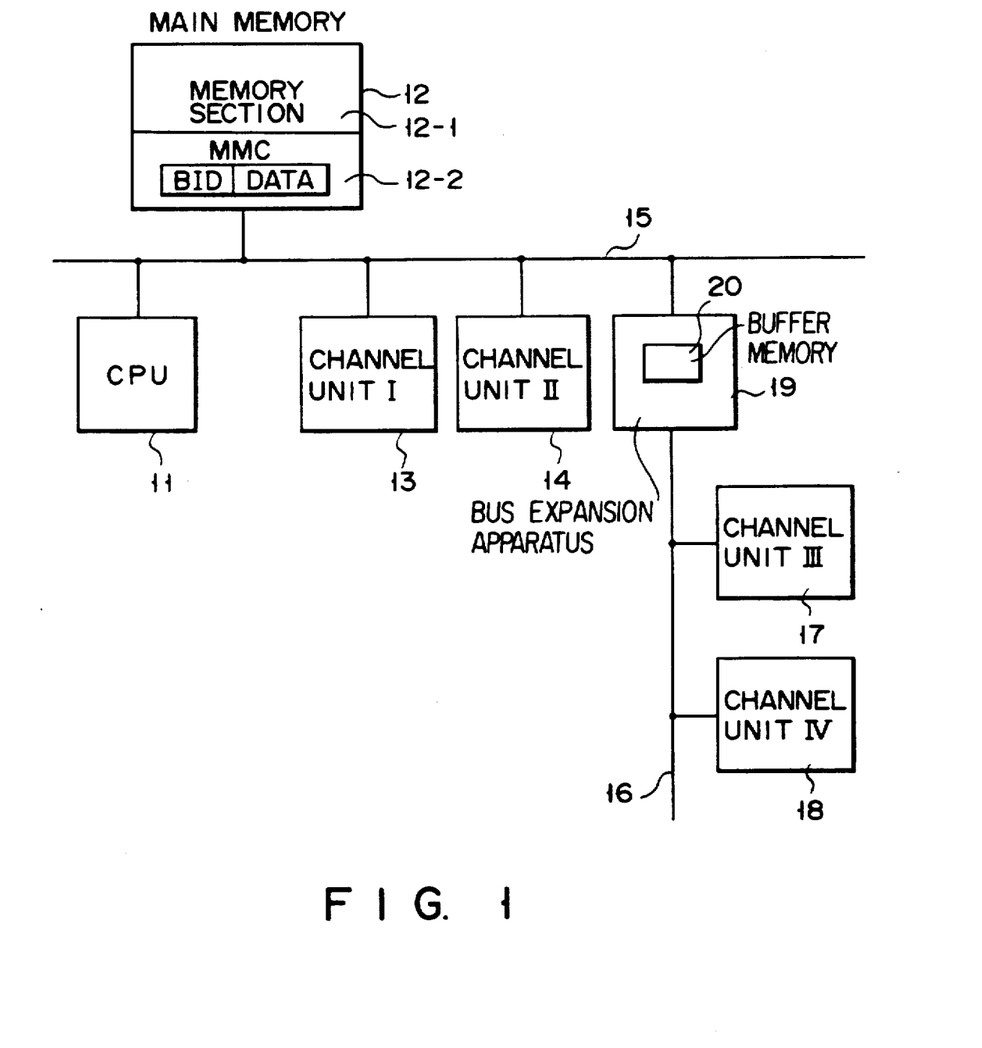
FIG. 1 is a block diagram showing a data processing system to which a bus expansion apparatus of the present invention is applied.
Figure 2:
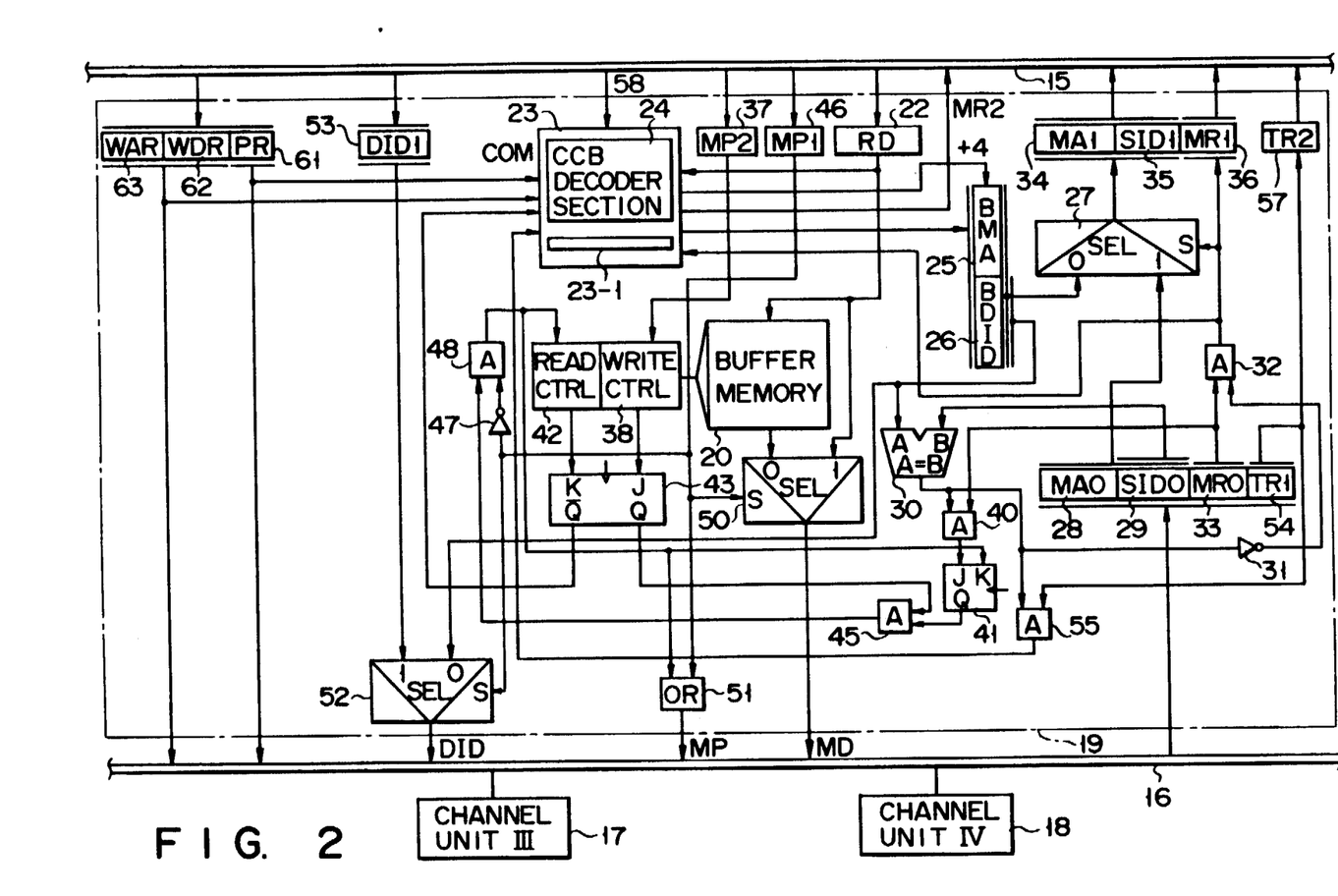
FIG. 2 is a block diagram showing a bus expansion apparatus according to a first embodiment of the present invention.

In the system shown in FIG. 1, CPU 11 and main memory 12 are connected to system bus 15. Channel units 13 and 14 as channel units I and II and bus expansion apparatus 19 are also connected to system bus 15. Channel units 17 and 18 as channel units III and IV are connected to expansion system bus 16 under bus expansion apparatus 19. Input/output (I/O) unit (not shown) are connected to channel unit 17 and 18.

CPU 11 controls the overall system and generates an input/output (I/O) start command to each channel unit. This I/O start command includes channel address WAR for designating a channel unit, start command PR for the designated channel unit, and storage start address WDR of channel control block CCB, in which the contents of an I/O operation to be performed by the designated channel unit are described. Main memory 12 includes memory section 12-1 and main memory controller (MMC) 12-2. Memory section 12-1 stores various programs, data and block CCB. MMC 12-2 receives a memory read request supplied from channel unit 13 or 14 connected to system bus 15, or from bus expansion apparatus 19. The memory read request accompanies memory address MA1 and a channel identifier, MMC 12-2 holds the received channel identifier as channel identifier BID, and outputs one-word data stored at memory address MA1 of memory section 12-1 to channel unit 13 or 14, or bus expansion apparatus 19, together with channel identifier BID and memory response MP1 or MP2.

Figure 4A:
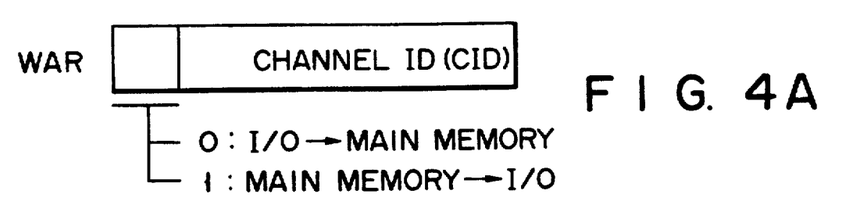
FIGS. 4A to 4C are views respectively showing formats of a channel address, write data, and a channel control block.
Figure 4B:
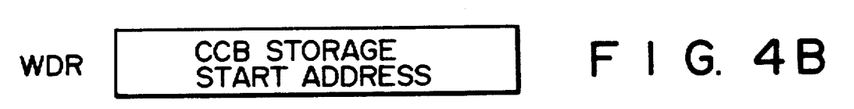
Figure 4C:
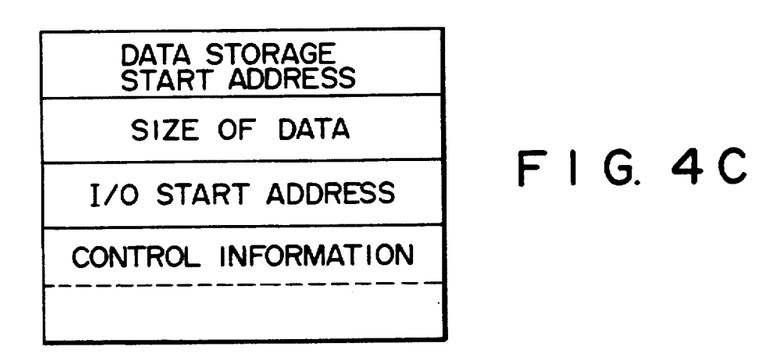
Figure 4D:
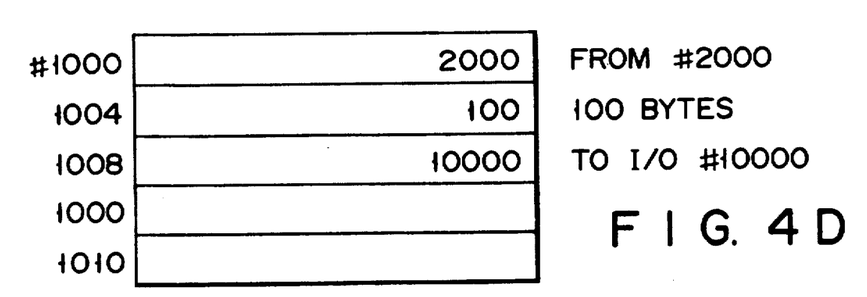
FIG. 4D is a view showing a channel control block.

As shown in FIG. 4A, according to the format of channel address WAR, the MSB constitutes a transfer direction designation bit, and the remaining portion constitutes channel identifier CID. When the transfer direction designation bit is set at logic "0", it designates data transfer from an I/O unit to main memory 12. When it is set at logic "1", it designates data transfer from main memory 12 to the I/O unit. A start address in main memory 12, at which block CCB associated with an I/O start command is stored, is written at CCB storage start address WDR. As shown in FIG. 4C, block CCB includes five words, i.e., a data storage start address in main memory 12 of data to be transferred, the size of the data in units of words, a start address in the I/O unit, and control information. For example, FIG. 4D shows a case wherein 100-byte data is transferred from address 2,000 of main memory 12 to address 10,000 of channel unit III. In this case, channel address WAR is "8000 0003", and data storage start address WAR is "0000 1000".

Next, the arrangement of bus expansion apparatus 19 will be described with reference to FIG. 2.

Buffer memory 20 is arranged in bus expansion apparatus 19. Buffer memory 20 temporarily stores one-word data which is read out from main memory 12 in response to a memory read request generated by bus expansion apparatus 19 prior to a memory read request from a channel unit designated by an output start command.

When CPU 11 outputs an output start command onto system bus 15 so as to start channel unit 17, start signal PR in the output start command is latched by register 61. In accordance with this latching, channel address WAR and CCB storage start address WDR in the output start command are latched by registers 63 and 62. Thereafter, the output start command is directed onto microcomputer COM 23 and expansion system bus 16. With this operation, the output start command can be also supplied to channel unit 17.

COM 23 is started by start signal PR, and determines whether a channel unit designated by channel identifier CID in channel address WAR is a channel unit to be controlled. When it is determined that channel unit 17 is designated, COM 23 checks whether a transfer direction designation bit in channel address WAR designates data transfer from main memory 12 to the I/O unit via the designated channel unit, or from the I/O unit to main memory 12. When it designates data transfer from main memory 12 to the I/O unit, CCB storage start address WDR is set in register 25 as memory address BMA, and channel identifier CID is set in register 26 as channel identifier BDID.

COM 23 incorporates counter 23-1 for holding the number of words to be transferred and CCB decoder section 24 for decoding block CCB read out from main memory 12. COM 23 selectively generates memory read request MR2 to access main memory 12. COM 23 resets register 25 and 26 in response to an input termination signal.

The contents of registers 25 and 26 are supplied to the 0 side input terminal of selector SEL 27. The 1 side input terminal of SEL 27 receives address MA0 and channel identifier SID0 latched by registers 28 and 29. The address, the channel identifier, and the memory read request output from channel unit 17 or 18 are latched by registers 28, 29, and 33 as address MA0, channel identifier SID0, and memory read request MR0. An output from AND gate 32 is supplied to selection control terminal S of SEL 27. An input to the 0 or 1 side input terminal is output to registers 34 and 35 in accordance with the output from AND gate 32. The contents held in registers 34 and 35 are output onto system bus 15 in response to memory read request MR1 or MR2.

Channel identifier BDID from register 26 is also supplied to the A input terminal of comparator 30. The B input terminal of comparator 30 receives channel identifier SID0 from register 29. When channel identifiers BDID and SID0 coincide with each other, comparator 30 outputs a coincidence signal of logic "1". The coincidence signal from comparator 30 is supplied to the input terminal of inverter 31 and is inverted. As a result, an incoincidence signal is obtained. This incoincidence signal is supplied to one input terminal of AND gate 32. The other input terminal of AND gate 32 receives memory read request MR0 from register 33. When memory read request MR0 is effective, request MR0 is at logic "1". An output from AND gate 32 is supplied to register 36 as memory read request MR1 as well as to selection control terminal S of SEL 27. The output from AND gate as the inhibition signal is output to COM 23 so a to signal that memory read request MR0 is output from channel unit 18.

More, specifically, the output from AND gate 32 is set at logic "1" only when channel identifier BDID held in register 26 does not coincide with channel identifier SID0 held in register 29, and memory read request MR0 is set in register 33, i.e., when a memory read request is output from channel unit 18, which has a channel identifier different from channel identifier BDID. Therefore, in a case that memory read request MR0 is output from channel unit 17 designated by the output start command, the output signal from AND gate 32 is always set at logic "0", so that address BMA held in register 25 and channel identifier BDID held in register 26 are selected by SEL 27 and output to registers 34 and 35. In contrast to this, when memory read request MR0 is generated from channel unit 18, memory address MA0 and channel identifier SID0 latched by registers 28 and 29 are selected by SEL 27 and are supplied to registers 34 and 35.

When address WDR and channel identifier CID are set in registers 25 and 26 in accordance with an output start command, COM 23 selectively generates memory read request MR2 and outputs memory MR2 for main memory 12 onto system bus 15. Request MR2 has the lowest priority level on bus control on system bus 15. Consequently, memory read request MR2 can be generated only when it is determined from signal 58 that system bus 15 is empty. In response to request MR2, address MA1 and channel identifier SID1 held in registers 34 and 35 are output onto system bus 15. The same operation is performed when memory request MR1 is output from register 36.

When MMC 12-2 of main memory 12 accepts memory read request MR2 or MR1, it latches channel identifier SID1 as channel identifier BID, and outputs memory response MP2 or MP onto system bus 15 together with 4-byte data stored at input memory address MA1 and latched channel identifier BID. The data on system bus 15 is latched by read data register 22. Channel identifier BID is latched by register 53 as channel identifier DID1. Memory response MP1 or MP2 is latched by register 46 or 37. Data RD held in register 22 is supplied to buffer memory 20 and the 1 side input terminal of SEL 50. When data RD is a word of block CCB, data RD is supplied to COM 23 and is decorded by section 24. Memory response MP2 latched by register 37 is supplied to write controller 38 for controlling writing of data RD in buffer memory 20.

In response to memory response MP2 from register 37 as a write instruction, write controller 38 writes data RP in buffer memory 20. Controller 38 also sets J-K flip-flop (F/F) 43 in response to the write instruction. Output $\overline{Q}$ of F/F 43 as a ready signal becomes low. When the ready signal is low, memory read request MR2 is not generated but memory address BMA is incremented by four.

As described above, the output start command output from CPU 11 is also supplied onto expansion system bus 16 through bus expansion apparatus 19. When channel unit 17 is designated by channel identifier CID in the output start command, it reads block CCB from buffer memory 20 in units of words, and performs an output operation designated by block CCB. Therefore, when a memory read operation is designated by block CCB, memory read request MR0 is output from channel unit 17 together with memory address MA0 and channel identifier SID0.

Memory address MA0, channel identifier SID0, and memory read request MR0 output from channel unit 17 are respectively latched by registers 28, 29, and 33. Memory read request MR0 held in register 33 is supplied to one input terminal of AND gate 32 and one input terminal of AND gate 40. The other input terminal of AND gate 40 receives an output from comparator 30. AND gate 40 outputs a signal of logic "1" only when both memory read request MR0 from register 33 and a coincidence signal from comparator 30 are set at logic "1", i.e., when the memory read request is output from channel unit 17. The output from AND gate 40 is supplied to the J input terminal of J-K flip-flop (to be referred to as an F/F hereinafter) 41, and F/F 41 is set.

Write controller 38 sets J-K flip-flop (F/F) 43 when one-word data is written in buffer memory. When F/F 43 is set, F/F 43 outputs a signal of logic "1" indicating that buffer memory 20 is full. The Q output from F/F 43 is supplied to one input terminal of AND gate 45, whereas the Q output from F/F 41 is supplied to the other input terminal of AND gate 45. AND gate 45 outputs a signal of logic "1" only when both the Q outputs from F/F 41 and 43 are set at logic "1", i.e., when buffer memory 20 is full and memory read request MR0 is generated by channel unit 17.

An output from register 46 for holding memory response MP1 is supplied to the input terminal of inverter 47 and is inverted. An output from inverter 47 is supplied to one input terminal of AND gate 48, whereas an output from AND gate 45 is supplied to the other input terminal of AND gate 48. AND gate 48 outputs a read instruction of logic "1" when the output from inverter 47 is set at logic "1", i.e., when memory response MP1 to memory read request MR1 is not present, and the output from AND gate 45 is set at logic "1". The read instruction from AND gate 48 is supplied to read controller 42. In response to the read instruction, read controller 42 reads out a data word (4 bytes) from buffer memory 20. The data word readout from buffer memory 20 is supplied to the 0 side input terminal of SEL 50. The 1 side input terminal of SEL 50 receives data RD from register 22, whereas selection control terminals S receives memory response MP1 from register 46. When response MP1 is set at logic "0" as in this case, SEL 50 outputs onto expansion system bus 16 the data word from buffer memory 20, which is supplied to the 0 side input terminal.

The read instruction from AND gate 48 is also supplied to one input terminal of OR gate 51. The other input terminal of OR gate 51 receive memory response MP1 from register 46. OR gate 51 outputs memory response MP of logic "1" onto expansion system bus 16 when either the output from ANP gate 48 or memory response MP1 is set at logic "1", i.e., when the data word is read out from buffer memory 20, or when memory response MP1 is to be fed back to channel unit 18.

The output of logic "1" from AND gate 48 is also supplied to the K input terminal of F/F 41. As a result, F/F 41 is reset. When next memory read request MR0 is output from channel unit 17 after data RD is stored in buffer memory, F/F 41 is set again. As a result, data RD readout from buffer memory 20 is output to the 0 input terminal of SEL 50. When buffer memory 20 becomes empty, the Q output from F/F 43 is set at logic "0". As a result, outputs from AND gates 45 and 48 are set at logic "0" regardless of the Q output from F/F 41. The operation of reading out data from buffer memory 20 is waited until a next data word from main memory 12 is written in buffer memory 20. Counter 23-1 in COM 23 is decremented one by one in response to $\overline{Q}$ output from F/F 43 as ready signal.

Memory response MP1 from register 46 is supplied to selection control terminal S of SEL 52, as well as to inverter 47. The 0 side input terminals of SEL 52 receives channel identifier BDID from register 26, whereas the 1 input terminal receives channel identifier DID1 from register 53. SEL 52 outputs channel identifier BDID from register 26 supplied to the 0 side input terminal as channel identifier DID representing destination channel unit 17 when response MP1 is set at logic "0". When channel identifier DID output onto expansion system bus 16 coincides with its own channel identifier, channel unit 17 fetches a data word output from SEL 50 at a timing of memory response MP output from OR gate 51.

As described above, in this embodiment, a data read operation, which is normally executed by channel unit 17 in accordance with block CCB, is controlled by F/F 43. When memory read request MR0 is output from channel unit 17 to perform a normal data read operation, the data word stored in buffer memory 20 is read out and is fed back to channel unit 17. In this case, since AND gate 32 inhibits memory read request MR0 from being supplied to system bus 15 as MR1, the load of system bus 15 is decreased.

In this embodiment, while a data word is stored in buffer memory 20, an I/O start command may be output from CPU 11 to start channel unit 18. In this case, the I/O start command is output to channel unit 18 through registers 61 to 63. COM 23, however, ignores the I/O start command. When memory read request MR0 is output from channel unit 18 in response to the I/O start command, an output from comparator 30 is set at logic "0" representing an incoincidence. When the output from comparator 30 is set at logic "0", memory read request MR0 from channel unit 18 is output onto system bus 15 as memory read request MR1 validated by AND gate 32. Memory address MA0 and channel identifier SID0 from channel unit 18 are selected by SEL 27, and are output onto system bus 15 as memory address MA1 and channel identifier SID1. With this operation, memory read is performed in the same manner as in the conventional system. When the output from comparator 30 is set at logic "0", the Q output from F/F 41 is also set at logic "0", and hence an output from AND gate 48 is set at logic "0". When the output of AND gate 48 is set at logic "0", data read operation from buffer memory 20 is inhibited.

When request MR1 corresponding to memory read request MR0 from channel unit 18 is output to system bus 15, and is accepted by main memory 12, a memory read operation is executed by MMC 12-2. As a result, data word RD from main memory 12 is fed back to bus expansion apparatus 19 through system bus 15 together with memory response MP1 of logic "1" and channel identifier BID. Data word RD, memory response MP1, and channel identifier BID as channel identifier DID1 are respectively latched by registers 22, 46, and 53. When response MP1 is set at logic "1", data word RD held in register 22 is output from SEL 50 onto expansion system bus 16, and channel identifier DID1 held in register 53 is output from SEL 52 onto expansion system bus 16 as channel identifier DID representing destination channel unit 18. In addition, OR gate 51 outputs valid memory response MP in response to memory response MP1 of logic "1".

When channel unit 17 has completed a data read operation for a transfer amount designated by block CCB, unit 17 outputs a termination request TR1 accompanying its own channel identifier onto expansion system bus 16. Termination request TR1 of logic "1" from channel unit 17 is received by bus expansion apparatus 19. Channel identifier SID0 and terminate request TR1 are respectively latched in register 29 and 54. Terminate request TR1 held in register 54 is supplied to one input terminal of AND gate 55. The other input terminal of AND 55 receives an output from comparator 30. When both the output from comparator 30 and terminate request TR1 from register 54 are set at logic "1", i.e., when a terminate request is output from channel unit 17, AND gate 55 outputs a termination signal of logic "1" from AND gate 55 to COM 23. COM 23 clears registers 25 and 26, and releases buffer memory 20 for a memory read operation to be performed next. In addition, terminate request TR1 from register 54 is output to CPU 11 as terminate request TR2 through register 57 and system bus 15.

Figure 3A:
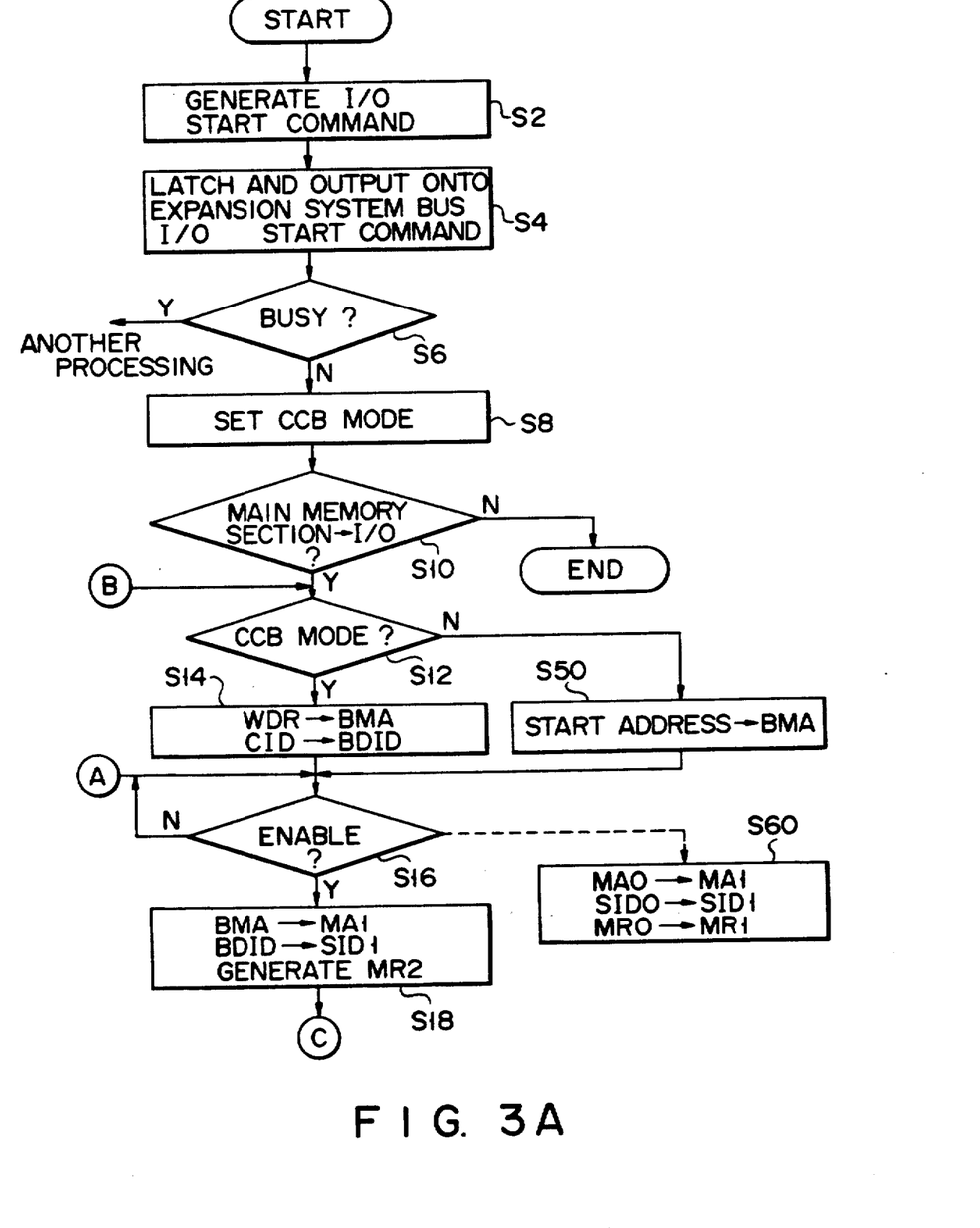
FIGS. 3A and 3B are flow charts for explaining an operation of the first embodiment.
Figure 3B:
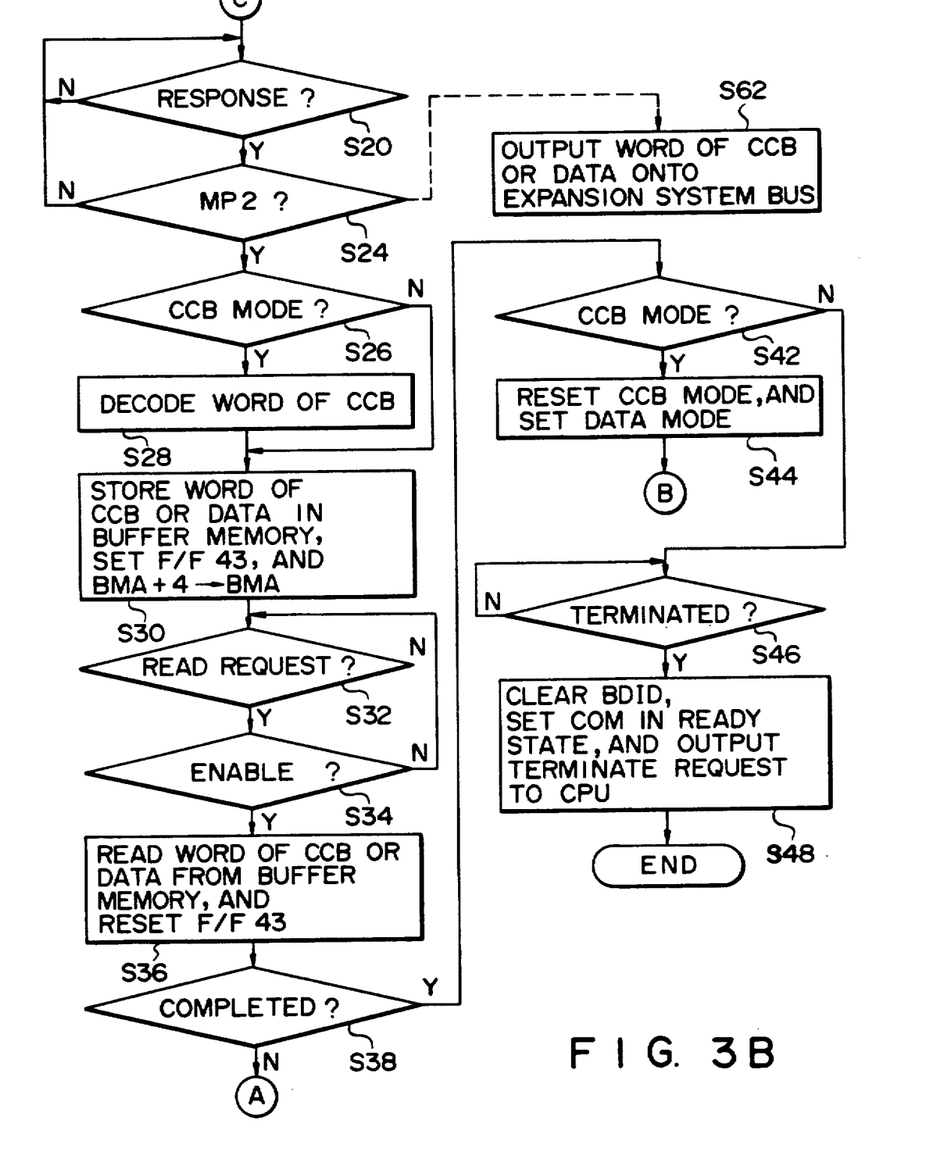

An operation of the bus expansion apparatus according to the first embodiment of the present invention will be described below with reference to FIGS. 3A and 3B.

Figure 5:
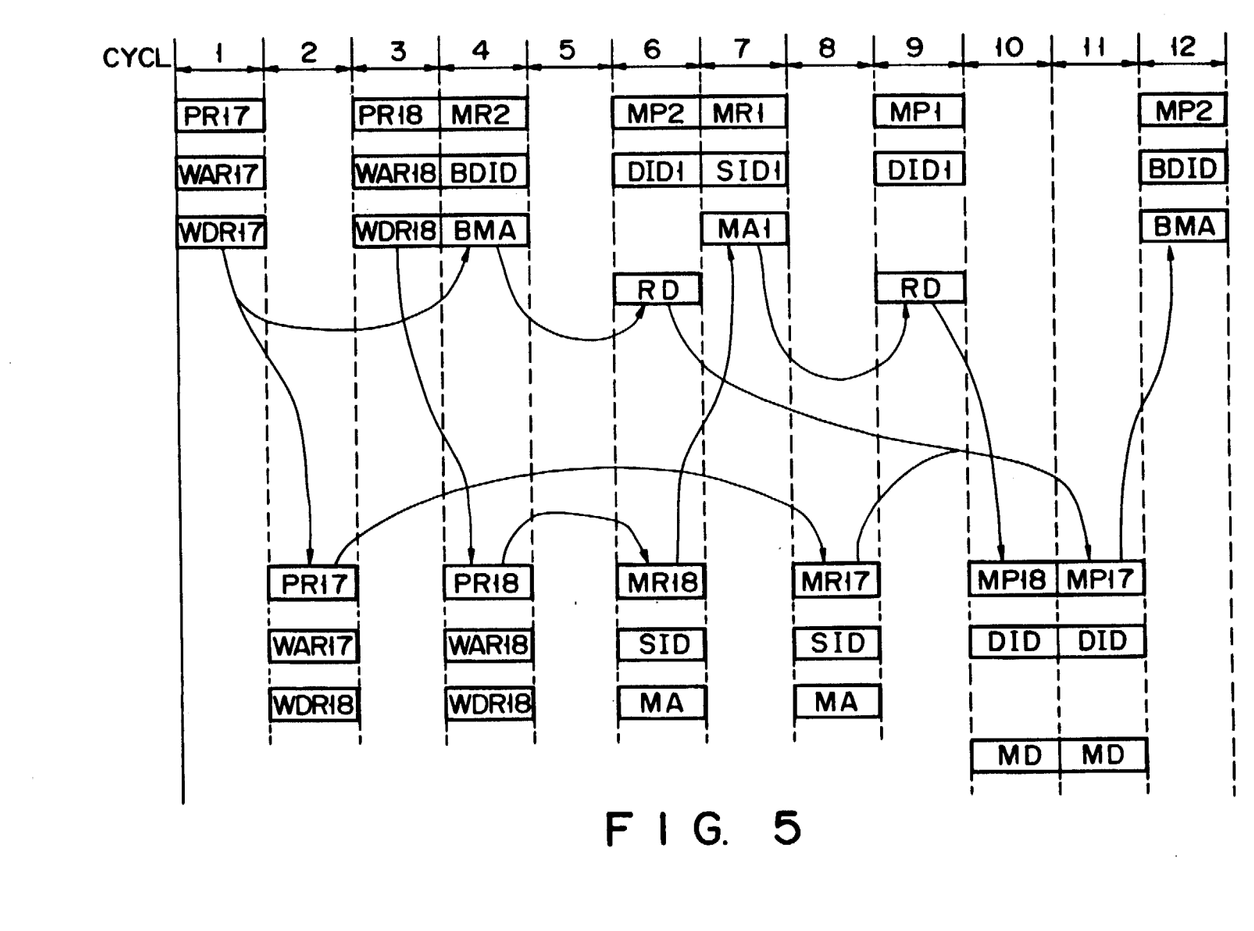
FIG. 5 is a timing chart for explaining an operation of the first embodiment.

In step S2, CPU 11 outputs an output start command onto system bus 15 in cycle 1 as shown in FIG. 5 so as to start channel unit 17 connected to expansion system bus 16. This output start command includes start signal PR, CCB storage start address WDR, and channel address WAR, as mentioned above. In order to prevent collision of data on system bus 15, the output start command is not generated while memory response MP1 or MR2 is fed back from main memory 12 to bus expansion apparatus 19. Start signal PR is latched by register 61 in step S4. In response to start signal PR, CCB storage start address WDR and channel address WAR are respectively latched by registers 62 and 63. Subsequently, as indicated in cycle 2, start signal PR, CCB storage start address WDR, and channel address WAR are supplied onto expansion system bus 16. As a result, the output start command from CPU 11 is supplied to channel unit 17. In addition, even if an I/O start command for channel unit 18 is generated from CPU 11 in cycle 3 while channel unit 17 is accessed, this command can be supplied to channel unit 18 in cycle 4. The output start command latched in registers 61 to 63 is supplied to COM 23. If COM 23 is busy at this time, Y is obtained in step S6, the output start command is ignored, and the currently executed processing is continued. If not busy, N is obtained in step S6, and COM 23 is started.

When COM 23 determines that the output start command is for channel unit 17 to be controlled, the CCB mode is set in step S8. In step S10, the MSB of channel address WAR as a transfer direction designation bit is checked. If the transfer direction designation bit is "0" as shown in FIG. 4A, data transfer is performed from the I/O unit to main memory 12, and hence COM 23 is not operated thereafter. If the transfer direction designation bit is "1", data transfer is performed from main memory 12 to the I/O unit, and hence step S12 is executed. In step S12, it is checked if the CCB mode is set, i.e., if a data mode is not set. Since the CCB mode is currently set, CCB storage start address WDR and channel identifier CID held in registers 62 and 63 are respectively set in registers 25 and 26 as address BMA and channel identifier BDID in step S14. Subsequently, step S16 is executed.

In step S16, it is checked from a ready signal output from F/F 43, a terminate signal output from AND gate 55, and an inhibition signal output from AND gate 32, by COM 23 in step S16 if generation of memory read request MR2 is enabled. When Y in step S16, address BMA and channel identifier BDID held in registers 25 and 26 are respectively set in registers 34 and 35 as address MA1 and channel identifier SID1 through SEL 27 in step S18. In addition, memory read request MR2 is generated by COM 23, and address MA1 and channel identifier SID1 are output onto system bus 15 in response to request MR2, as indicated in cycle 4. As described above, the lowest priority level is assigned to memory read request MR2 on system bus 15. When it is determined from signal 58 that system bus 15 is empty, memory read request MR2 is generated.

In main memory 12, MMC 12-2 latches channel identifier SID1 as channel identifier BID in response to memory request MR2, and reads out block CCB or data of one word from memory address MA1 of memory section 12-1. The readout word is fed back to bus expansion apparatus 19 together with channel identifier BID and memory response MP2, as indicated in cycle 6.

In bus expansion apparatus 19, memory response MP2 from main memory 12 is waited in steps S20 and S24. When memory response MP2 is received by register 37, channel identifier BID is latched by register 53 as channel identifier DID1 and the word is latched by register 22 in response to the reception of memory response MP2. In step S26, it is checked whether or not the CCB mode is net. If N in step S26, step S30 is directly executed. If Y in step S26, the word is supplied to COM 23, and is decoded by CCB decoder section 24 in step S28. Thus, block CCB is read in units of words, and, the start storage address of the data in main memory 12, the size of the data, the start address of the I/O unit, and the like are sequentially held in COM 23. The size of the data is set in counter 23-1.

In response to response MP2, write controller 38 is started simultaneously with the decoding operation. With this operation, the word of block CCB is stored at buffer memory 20 in step S30. At this time, F/F 43 is set by controller 38. Thereafter, memory address BMA held in register 25 is incremented by four.

In steps S32 and S34, memory read request MP0, memory address MA0 and channel identifier SID0 from channel unit 17 are waited. When it is confirmed by an output from AND gate 45 that memory read request MR0 generated by channel unit 17 in response to the output start command is received in cycle 8 and memory response MP1 not received read controller 42 is started in step S36. As a result, a word is read out from buffer memory 20, and F/F 43 is reset controller 42. The readout word is output onto expansion system bus 16 through SEL 50, as indicated in cycle 11. An output from AND gate 48 as response MP and channel identifier DID1 as channel identifier DID are output through OR gate 51 and SEL 52, respectively, onto expansion system bus 16. In this manner, the word is supplied to channel unit 17 as if it accessed main memory 12.

In step S38, it is determined whether transfer of the number of words set in COM 23, i.e., five word in the CCB mode and a size of the data designated by block CCB, is completed. If N in step S38, step S16 is executed again. All the data words of block CCB are supplied to channel unit 17 and decoded by CCB decoder section 24, in this manner.

If Y in step S38, it is checked if the CCB mode is set in step S42. If N in step S42, step S46 is executed. If Y in step S42, step S44 is executed to reset the CCB mode and to set the data mode. Thereafter, step S12 is then executed again for the data to be transferred. In the data mode, N is obtained in step S12, and a start memory address is set in register 25 as memory address BMA in step S50. Subsequently, the processing from steps S16 to S42 is executed in the same manner as that of the CCB read operation.

If Y in step S42, step S46 is executed in the data mode after step S42, so that terminate request TR1 from channel unit 17 is waited. When terminate request TR1 is received by register 54, the contents of registers 25 and 26 are cleared in response to an output from AND gate 55. In addition, COM 23 outputs terminate request TR1 to CPU 11 as terminate request TR2, and is set in a ready state.

When an I/O start command for channel unit 18 is input to bus expansion apparatus 19 as indicated in cycle 3, the I/O start command is transferred to channel unit 18 as indicated in cycle 4 regardless of the state of COM 23. When memory read request MR0 generated from channel unit 18 in response to the I/O start command is received in cycle 6, memory address MA0, channel identifier SID0, and request MR0 are respectively latched by registers 34, 35, and 36 as memory address MA1, channel identifier SID1, and request MR1 through SEL 27 and AND gate 32, and are output onto system bus 15, as indicated in cycle 7. When memory read request MR0 from channel unit 18 is received, generation of memory read request MR2 from COM 23 is inhibited by the output of AND gate 32. When response MP1 to request MR1 is received by bus expansion apparatus 19 as indicated in cycle 9, a data read operation from buffer memory 20 is inhibited by inverter 47 and AND gate 48, and as shown in step S34, a data word latched in register 22 in response to response MP1 is output onto expansion system bus 16 through SEL 50 in cycle 10. In addition, channel identifier DID1 is also output onto expansion system bus 16 through SEL 52 as channel identifier DID. As described above, a memory read request from channel unit 18 can be executed regardless of the state of COM 23.

A bus expansion apparatus according to a second embodiment of the present invention will be described below. An arrangement of the second embodiment is substantially the same as that of the first embodiment, and hence only different points will be described below with reference to FIG. 6.

Figure 6:
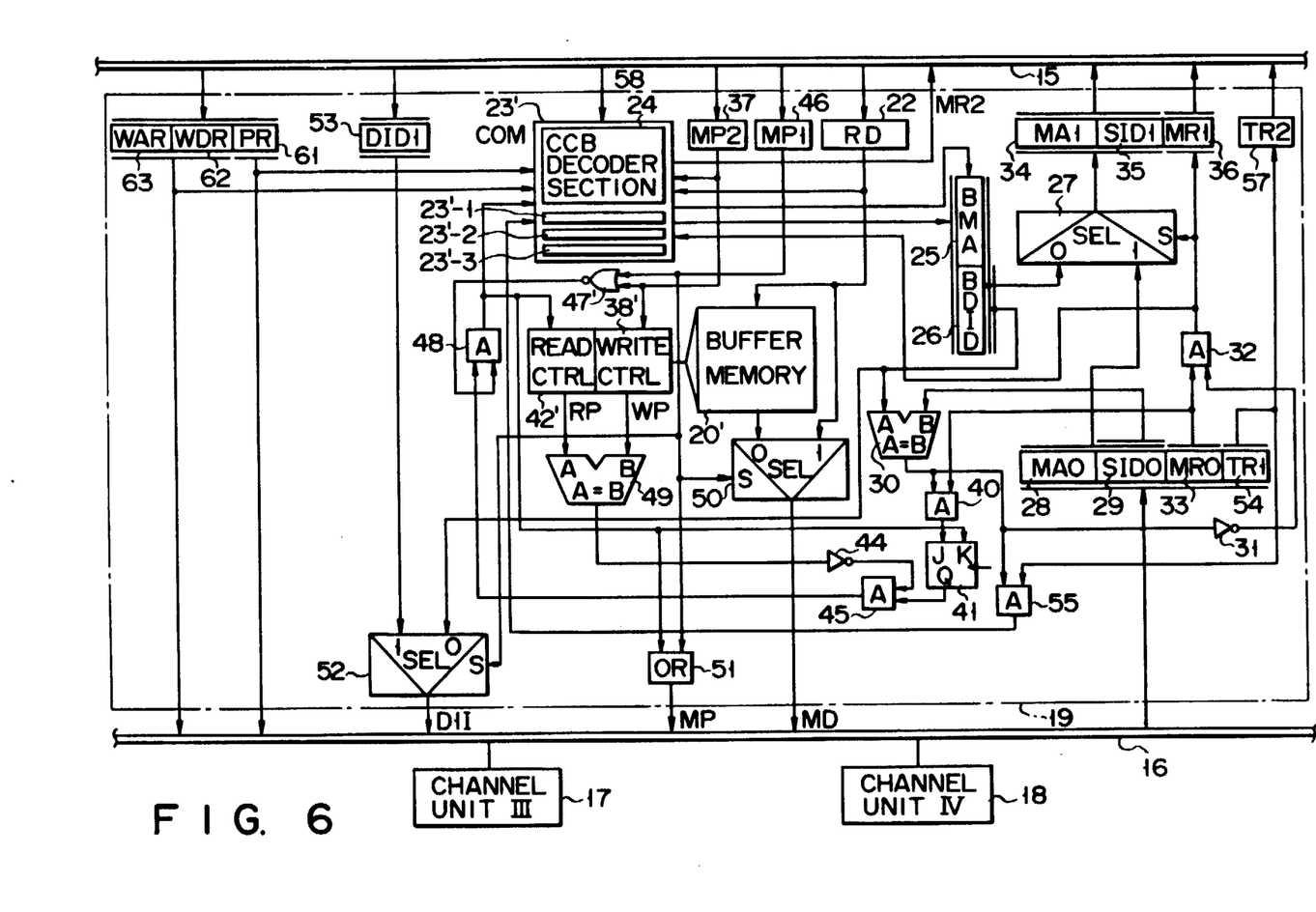
FIG. 6 is a block diagram showing a bus expansion apparatus according to a second embodiment of the present invention.

In the second embodiment, buffer memory 20 has a capacity of a plurality of words, e.g., eight words.

In response to memory response MP2 from register 37, write controller 38' writes data word RD in buffer memory 20 at an address designated by write pointer WP. Subsequently, pointer WP is incremented by one. In response to an output from AND gate 48, read controller 42' read a data word from an address of buffer memory designated by read pointer RP. Subsequently, pointer RP is incremented by one. Read pointer RP is supplied to the A input terminal of comparator 49. The B input terminal of comparator 49 receives write pointer WP from write controller 38'. Comparator 49 compares inputs to both the A and B input terminals. When read and write pointers RP and WP coincide with each other, comparator 49 outputs a signal of logic "1" indicating that buffer memory 20 is empty. The output from comparator 49 is supplied to the input terminal of inverter 44, and is inverter. An output from inverter 44 is supplied to one input terminal of AND gate 45, whereas the Q output from F/F 41 is supplied to the other input terminal of AND gate 45. AND gate 45 outputs a signal of logic "1" only when both of the output from inverter 44 and the Q output from F/F 41 are set at logic "1", i.e., when buffer memory 20 is not empty and memory read request MR0 is generated by channel unit 17.

Bus expansion apparatus 19 includes register 46 for holding memory response MR1 fed back from main memory 12 together with data word RD read out in response to memory read request MR1. An output from register 46 is supplied to the one input terminal of NOR gate 47'. Memory response MP2 is supplied to the other input terminal of NOR gate 47'. Therefore, a read operation from buffer memory 20 is inhibited when either response MP1 or response MP2 is set at logic "1". An output from NOR gate 47' is supplied to one input terminal of AND gate 48, whereas an output from AND gate 45 is supplied to the other input terminal of AND gate 48. AND gate 48 outputs a signal of logic "1" when the output from NOR gate 47 is set at logic "1", i.e., when memory response MP1 or memory response MP2 is not present, and the output from AND gate 45 is set at logic "1". The output of logic "1" from AND gate 48 is supplied to read controller 42', COM 23', OR gate 51, and F/F 41. In response to the output of AND gate 48, read controller 42' reads out a data word (4 bytes) from an address of buffer memory 20' designed by read pointer RP.

COM 23' includes CCB decoder section 24, and counters 23'-1, 23'-2 and 23'-3. Counter 23'-1 counts down from the number of data words to be transferred one by one each time memory read request MR2 is generated. Counter 23'-2 counts down from the number of data words to be transferred one by one each time an output from AND gate 48 is generated. Counter 23'-3 counts up by one in accordance with memory response MP2 and counts down by in accordance with an output of AND gate 48. COM23' generates memory read request MR2 when a value of counter 23,-1 is not equal to 0, the inhibition signal and the termination signal are set at logic "0", and a value of counter 23'-3 is less than nine.

An operation of the second embodiment will be described below with reference to FIGS. 6A and 6B.

Figure 7A:
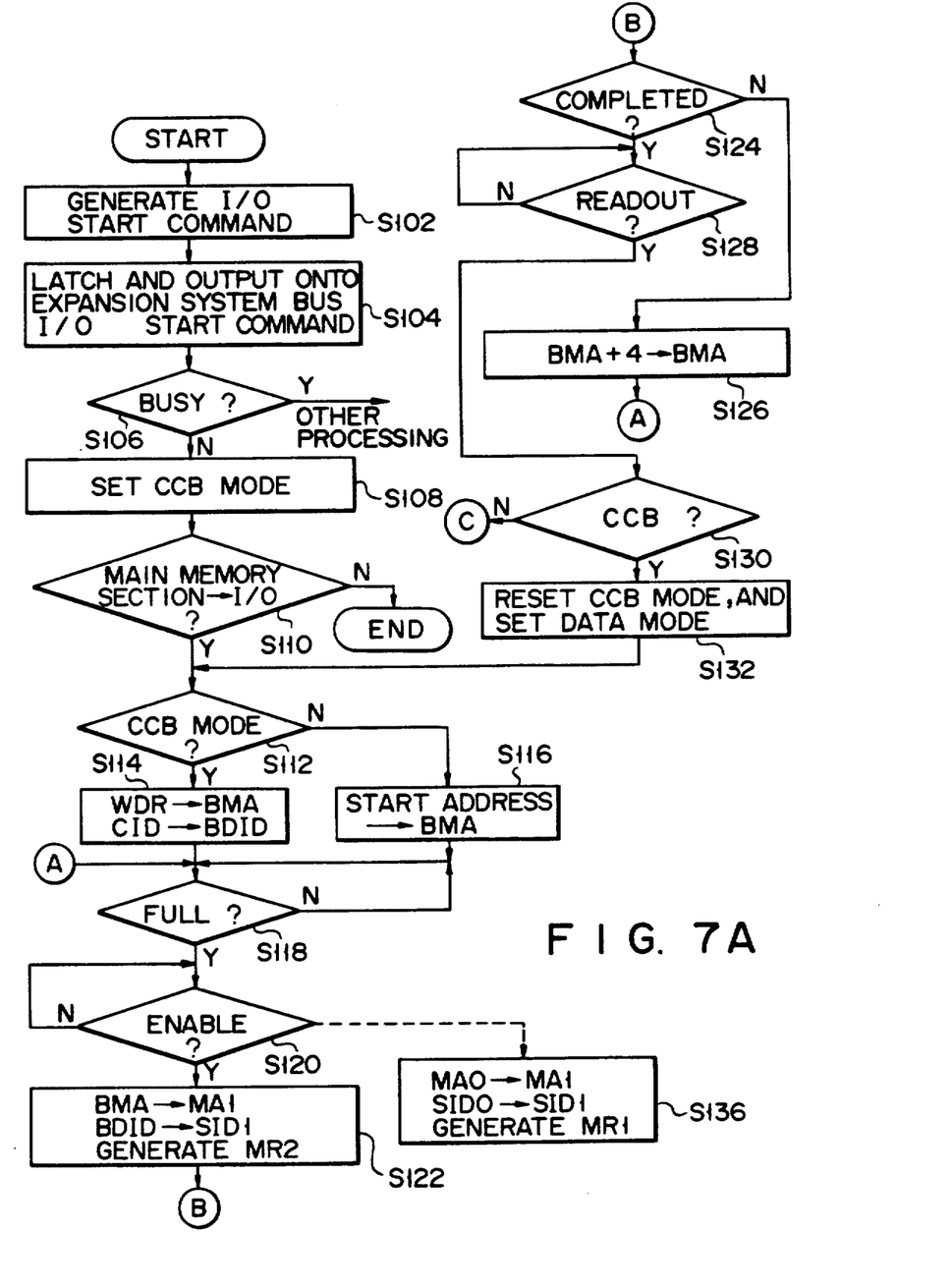
FIGS. 7A to 7D are flow charts for explaining an operation of the second embodiment.

In step S102, an output start command is output from CPU 11 onto system bus 15. The output start command is then supplied to channel unit 17 connected to system bus 16 in step S104, and is also supplied to COM 23' if COM 23' is not busy. As a result, COM 23' is started in step S108. If COM 23' is busy at this time, currently executed processing is continued. When channel unit 17 is designated by channel identifier CID in channel address WAR, the CCB mode is set in step 108. In step S110, the MSB of channel address WAR as a transfer direction designation bit is checked. Since the command from CPU 11 is an output start command, Y is obtained in step S110. Step S112 is then executed.

In step S112, it is checked if the CCB mode is set (data mode is not set). Since the CCB mode is currently set, CCB storage start address WDR and channel identifier CID held in registers 62 and 63 are respectively latched by registers 25 and 26 as address BMA and channel identifier BDID in step S114. Subsequently, step S118 is executed.

In step S118, it is checked, if buffer memory 20 is full, from a value of counter 2340 -3. If buffer memory 20 is full, the processing is waited until it becomes not full. When it becomes not full, it is checked in step S120 if COM 23' is enabled to generate memory read request MR2. If Y in step S120, address BMA and channel identifier BDID held in registers 25 and 26 are respectively set in registers 34 and 35 as address MA1 and channel identifier SID1 through SEL 27 is step S122. In addition, COM 23' checks if system bus 15 is empty by using line 58. If it is empty, COM 23' generates memory read request MR2. In response to request MR2, address MA1 and channel identifier SID1 are output onto system bus 15. Similar to the first embodiment, the lowest priority level is assigned to memory read request MR2 on system bus 15.

In step S124, it is checked if a value of counter 23'-1 is equal to "0". If N in step S124, memory address BMA is incremented by four in step S126, and step S118 is executed again. If Y in step S124, it is checked in step S128 if the CCB mode is set. If N in step S128, i.e., the data mode is set, the read data request generation processing is completed. If Y in step S128, completion of decoding is waited in step S130. If all the data of block CCB are decoded, the CCB mode is reset in step S132, and the data mode is set. Subsequently, step S112 is executed again.

Similar to the first embodiment, the data words read out from memory section 12-1 of main memory 12 are fed back to bus expansion apparatus 19 together with channel identifier BID and memory response MP2.

Figures 7B, 7C, 7D:
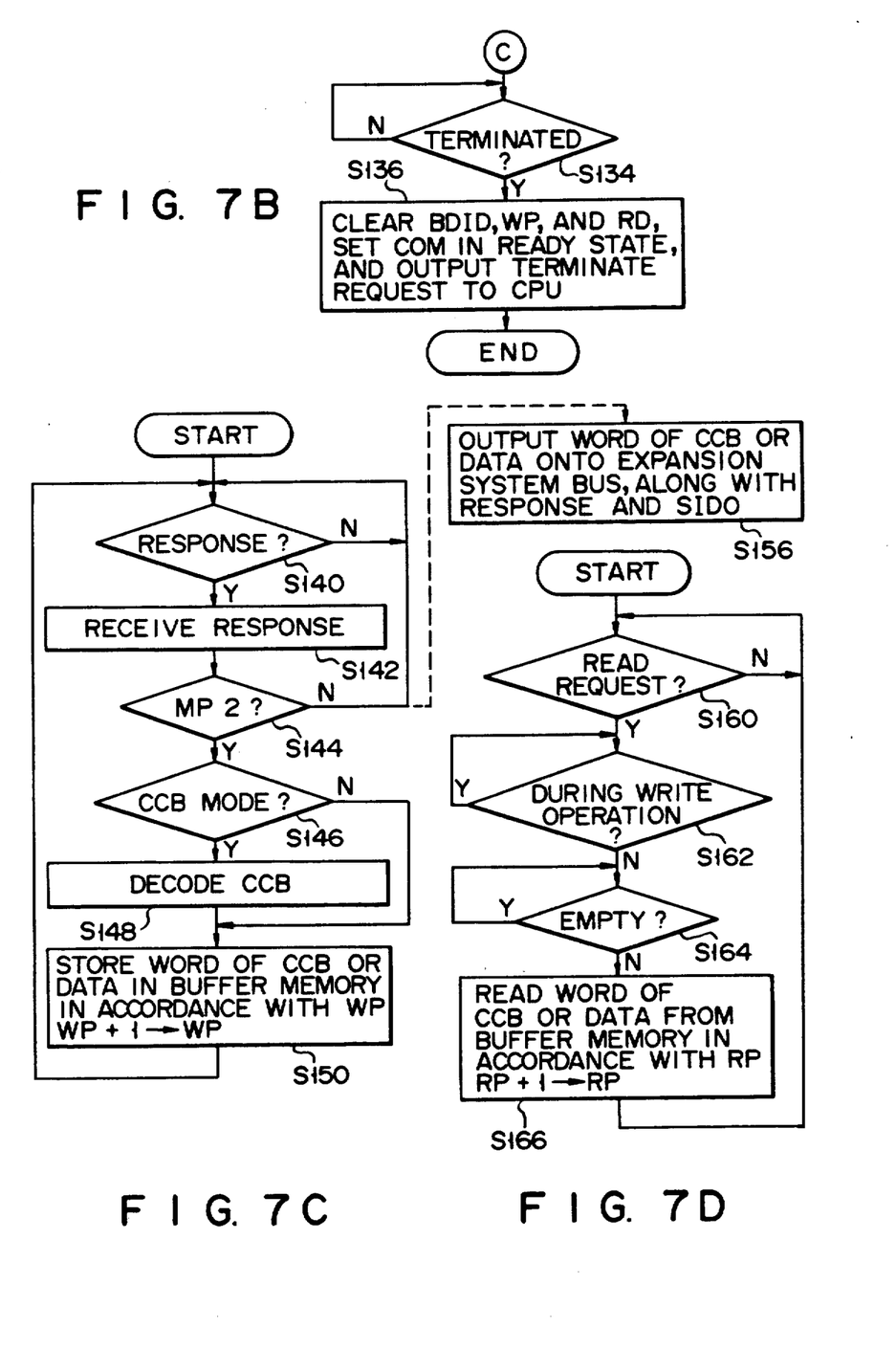

In bus expansion apparatus 19, memory response MP2 from main memory 12 is waited in steps S140 to S144. When memory response MP2 is received by register 37, channel identifier BID is latched by register 53 as channel identifier DID1 and the data word is latched by register 22 in response to memory response MP2 in step S142. And a value of counter 23'-2 is decremented by one. Processing when the response is response MP1 will be described later. If Y in step S144, it is checked in step S145 if the CCB mode is set. If Y in step S145, the data word latched by register 22 is supplied to COM 23' in step S146. COM 23' decodes the data word by using CCB decoder section 24. In this manner, block CCB is read in units of words, and the start storage address of the data of main memory 12, the size of the data, the start address of the I/O unit, and the like are sequentially held by COM 23'. In response to response MP2, it is checked simultaneously with decoding of the block CCB if read controller 42' is busy. If read controller 42' is busy, completion of the read operation is waited.

If N in step S148, one data word is stored at an address of buffer memory 20' designated by write pointer WP in step S150. In addition, write pointer WP is incremented by one. In step S152, it is checked if the data words for the transfer data size is transferred from main memory 12. If N in step S152, step S140 is executed again. If Y in step S152, it is checked in step S153 if the CCB mode is set. If Y in step S153, the decoded result is set in COM 23'. Subsequently, step S140 is executed again. If N in step S153, i.e., transfer of all the data words into buffer memory 20 in the data mode is completed, the processing is ended.

In step S160, memory read request MP0 from channel unit 17, and memory address MA0 and channel identifier SID0 associated therewith are waited. When it is confirmed from an output from AND gate 40 that read request MP0 from channel unit 17 is received, it is checked from an output of NOR gate 47' in step S162 if expansion system bus 16 or buffer memory 20' is busy. If write controller 38' or expansion system bus is not busy, it is checked in step S164 if buffer memory 20 is empty. If WP=RP, buffer memory 20 is empty. If RP<WP, a read operation can be performed. In step S166, read controller 42' is started. As a result, a data word is read out from an address of buffer memory 20 designated by read pointer RP, and is output onto expansion system bus 16 through SEL 50 is response to the output of AND gate 48. The output of AND gate 48 as response MP and memory identifier BDID as channel identifier DID are output onto expansion system bus 16 through OR gate 51 and SEL 52, respectively. In this manner, the data word is supplied to channel unit 17 as if it accessed main memory 12. Counters 23'-2 and 23'-3 count down by one. Subsequently, read pointer RP is incremented by one.

In step S168, it is determined from the value of counter 23'-2 whether transfer of data words is completed. If N in step S168, step S160 is executed again. If Y in step S168, it is checked in step S169 if the CCB mode is set. If Y in step S169, the processing is waited in step S170 until the decoded result of block CCB is set, and step S160 is executed again. If N in step S169, step S172 is executed. In step S172, terminate request TR1 from channel unit 17 is waited. When terminate request TR1 is received by register 54, the contents in register 26, write pointer WP, and read pointer RP are cleared in response to an output from AND gate 55 in step S174. COM 23' causes register 57 to output terminate request TR1 to CPU 11 as terminate TR2, and is set in a ready state.

As shown in step S136, when memory read request MR0 is received from channel unit 18, memory address MA0, channel identifier SID0, and request MR0 are respectively latched by registers 34, 35, and 36 as memory address MA1, channel identifier SID1, and request MR1 through SEL 27 and AND gate 32, and are output onto system bus 15 regardless of the state of COM 23'. When response MP1 to request MR1 is received by bus expansion apparatus 19, a read operation from buffer memory 20' is inhibited by NOR gate 47' and AND gate 48, and the data word latched by register 22 is output onto expansion system bus 16 through SEL 50, as shown in step S156. In addition, channel identifier DID1 is also output onto expansion system bus 16 through SEL 52. As described above, a memory read request from channel unit 18 can be executed regardless of the operation state of COM 23'.

What is claimed is:

1. A bus expansion apparatus capable of transferring a data word from a first unit connected to a system bus to a second unit connected to an extension bus, said first unit receiving a first read request input via said system bus, reading out the data word associated with the first read request, generating a first response in response to reading of the data word, and outputting the first response and the data word onto said system bus, and said second unit generating a second read request in response to an output start command supplied from a central processing unit (CPU) via said extension bus and receiving a second response and a data word from said extension bus, comprising:

request generating means responsive to the output start command supplied from said CPU, for selectively generating the first read request prior to generation of the second read request associated with the first read request and outputting the first read request onto said system bus;

command transfer means for transferring the output start command from the CPU to said request generating means and said extension bus;

buffer memory means for storing the data word;

write means responsive to the first response input via said system bus, for writing the data word in said buffer memory means; and read means responsived to the second rear request input via said extension bus, for selectively reading out the data word from said buffer memory, generating the second response and outputting the second response and the data word onto said extension bus.

2. The bus expansion apparatus according to claim 1, further comprising:

means for detecting that said buffer memory is empty; and said request generating means including means for generating the first read request when said buffer memory means is empty, said buffer memory means storing a single data word.

3. The bus expansion apparatus according to claim 1, wherein a third unit is connected to said extension bus, generates a third read request in response to a second output start command supplied from said CPU via said extension bus, and receives a third response and a second data word from said extension bus, said command transfer means includes means for transferring the second output start command from said CPU onto said extension bus, said first unit responds to the third read request input via said system bus to read out the second data word associated with the third read request, to generate the third response and to output the third response and the second data word onto said system bus, and the apparatus further comprises transfer means, coupled to said first unit, for transferring the third read request from said extension bus onto said system bus, and transferring the third response and the second data word onto said extension bus.

4. The bus expansion apparatus according to claim 3, further comprising means responsive to the third request input via said extension bus, for inhibiting said request generating means from generating the first request.

5. The bus expansion apparatus according to claim 3, further comprising means responsive to the third response from said system bus, for inhibiting said read means from reading out the data word from said buffer memory means.

6. The bus expansion apparatus according to claim 1, further comprising means responsive to the first response from said system bus, for inhibiting said read means from reading out the data word from said buffer memory means.

7. The bus expansion apparatus according to claim 1, wherein:

said write means includes, means for generating a write pointer, and means for writing the data word in said buffer memory means in accordance with the write point, sand updating the write point by one after writing the data word; and said read means includes, means for generating a read pointer, and means for reading out the data word from said buffer memory means in accordance with the read point, and updating the read point by one after reading the data word, said buffer memory means storing a plurality of data words.

8. The bus expansion apparatus according to claim 7, further comprising means for inhibiting said request generating means from generating the first request when a difference between the write point and the read point is more than the number of data words stored in said buffer memory.

9. The bus expansion apparatus according to claim 1, further comprising means responsive to the data word for selectively inhibiting said request generating means from generating the first read request, said first read request having the lowest priority on said system bus.

10. A method of transferring a data word from a first unit connected to a system bus to a second unit connected to an extension bus, said first unit receiving a first read request input via said system bus, reading out the data word associated with the first read request, generating a first response in response to reading of the data word, and outputting the first response and the data word onto said system bus, and said second unit generating a second read request in response to an output start command supplied from a central processing unit (CPU) via said extension bus and receiving a second response and the data word from said extension bus, comprising:

transferring the output start command from said system bus onto said extension bus;

selectively generating the first read request in response to the output start command supplied from said CPU on said system bus, prior to generating of the second read request associated with the first read request to output the first read request onto said system bus;

writing the data word in a buffer memory in response to the first response on said system bus; and reading out the data word from said buffer memory in response to the second read request on said extension bus, and generating the second response in response to reading the data word to output the second response and the data word onto said extension bus.

11. A method according to claim 10, wherein said request generating step includes generating the first read request when said buffer memory is empty, said buffer memory storing one data word.

12. A method according to claim 10, wherein a third read request is generated from a third unit connected to said extension bus, in response to a second output start command supplied by the CPU on said extension bus, and a third response and a second data word are received from said extension bus, said transferring step includes transferring the second output start command from said system bus onto said extension bus, reading out the second data word associated with the third read request, in response to the third read request on said system bus, and generating the third response to output the third response and the second data word onto said system bus, and the method further comprises transferring the third read request from said extension bus onto said system bus, and transferring the third response and the second data word onto said extension bus.

13. A method according to claim 12, further comprising inhibiting the first read request from being generated, in response to the third read request on said extension bus.

14. A method according to claim 12, further comprising inhibiting the data word from being read out from said buffer memory in response to the third response from said system bus.

15. A method according to claim 10, further comprising inhibiting the data word from being read out from said buffer memory in response to the first response from said system bus.

16. A method according to claim 10, wherein:

said writing step includes, writing the data word in said buffer memory in accordance with a write point, and updating the write point by one after writing the data word; and said reading step includes, reading the data word from said buffer memory in accordance with a read point, and updating the read pointer by one after reading the data word, said buffer memory storing a plurality of data words.

17. A method according to claim 16, further comprising:

inhibiting the first read request from being generated when a difference between the write pointer and the read pointer is more than the number of data words stored in said buffer memory.

18. A method according to claim 10, further comprising:

inhibiting the first read request from being generated in response to priority data in said system bus, said first read request generating step having the lowest priority on said first system bus.

* * * * *